United States Patent Office 3,505,260
Patented Apr. 7, 1970

3,505,260
ASPHALT-POLYOLEFIN FIBER BLENDS
Gene N. Woodruff, Bartlesville, Okla., assignor to Phillips Petroleum Company, a corporation of Delaware
No Drawing. Continuation of application Ser. No. 317,136, Oct. 18, 1963. This application Sept. 11, 1967, Ser. No. 666,994
Int. Cl. C08h 17/10; C08f 45/52; C08c 11/70
U.S. Cl. 260—28.5                           9 Claims

ABSTRACT OF THE DISCLOSURE

A blend or fabric of asphalt and polyolefin fiber, particularly useful for lining canals, ponds, and the like, is made by mixing or impregnating the fiber in finely divided form or woven or matted with an asphalt emulsion.

---

This application is a continuation application of our copending application Ser. No. 317,136, filed Oct. 18, 1963, now abandoned.

This invention relates to asphalt-polyolefin fiber blends. In one aspect the invention relates to an oil-in-water asphalt emulsion containing finely divided fibers of a polymer of an olefin.

The use of asphalt emulsions in the construction and repair of roads, pavements, soil stabilization, and the like, has become increasingly important. The type of asphalt emulsion which recently has come into widespread use in large volumes for such purposes is the acidic, oil-in-water cationic asphalt emulsions. This type of emulsion is prepared with cationic-active emulsifying agents, such as a fatty diamine hydrochloride or a quaternary ammonium salt. These emulsions are very effective on electro-negative aggregates, particularly siliceous aggregates. The cationic asphalt emulsions can be used as seal coats, or mixed with fine siliceous aggregates, such as sand, to form a slurry seal coat or mixed with coarser aggregates in the construction and surfacing of pavements.

It is an object of the invention to provide a novel oil-in-water asphalt emulsion blend.

It is another object of this invention to provide a novel blend of an oil-in-water asphalt emulsion and finely divided fibers of polyolefins.

Yet another object of this invention is to provide a method of impregnating a cloth or mat of fibers of polyolefins.

These and other objects of the invention will be readily apparent by those skilled in the art by reference to the following description and appended claims.

These objects are readily accomplished by a blend of finely divided polyolefin fibers and an oil-in-water asphalt emulsion comprising asphalt, water, and an emulsifying agent.

In one embodiment of the invention a cloth which is impervious to water is prepared from fibers of a polyolefin coated or impregnated with an oil-in-water asphalt emulsion prepared from asphalt, water, and an emulsifying agent.

The asphalt emulsion may be cationic, anionic or nonionic, or mixtures thereof, and may be prepared by any method suitable and known to those skilled in the art.

The asphalts used in the preparation of the emulsion include any of those bituminous materials used heretofore and known in the prior art, such as natural asphalts or those derived from petroleum refining, for example by steam refining and/or air blowing, and the like. Asphalts characterized by penetrations (ASTM D–5–51) from 0 to about 300 or even higher and preferably from about 40 to 300 and having softening points (ASTM D–36–26) in the range of 90 to 250° F. and preferably 100 to 150° F., represent suitable asphalts that can be employed.

The relative amounts of the various components of the asphalt emulsions can vary but in general the asphalt is present in an amount in the range of 50 to 70, preferably 60 to 65 weight percent; the emulsifier is present in an amount in the range of 0.1 to 4, preferably 0.25 to 1; and water is present in the amount between 50 and 25, preferably 32–39 weight percent based on the total blend.

The asphalt emulsions employed can be prepared by any method known to those skilled in the art, for example, by preparing a soap solution comprising water, either soft or hard, and an emulsifying agent, either cationic, anionic, or nonionic. The soap solution is then mixed in a colloid mill or the like with the asphalt phase, the latter being preferably heated to reduce the viscosity. Usually, the emulsifiers and any modifiers or promoters are dispersed in the water to form a soap solution which is then warmed to a temperature of 90 to 200° F., preferably 90 to 125° F. The asphalt can be heated to a temperature in the range of 150 to 350° F., preferably 250 to 300° F. The warm soap solution and hot asphalt are then proportioned to a colloid mill to emulsify the mixture during which milling the temperature of the mixture can be in the range of 100 to 210° F., preferably 150 to 200° F. The completed emulsion is then cooled to a temperature below 150° F. before being used or transferred to storage. The method of preparing an emulsion will have some effect on the properties thereof and the intended application or utility of the emulsion will dictate which particular method one should use to get the desired properties.

It has now been found that fibers of polyolefins, particularly finely divided fibers of polymers of mono-1-olefins having from 2 to 8 carbon atoms per molecule, preferably polymers of ethylene or propylene including both homopolymers and copolyomers, can be mixed with or impregnated with or coated with an asphalt emulsion such as hereinbefore described to provide either a moldable or sprayable mixture. In addition, the emulsion or blend of emulsion and fibers can be applied to a cloth or mat made from fibers that have been previously woven or matted into a cloth or a structure resembling same to form a water-proof structure. The water in the emulsion is then removed by any suitable method such as air drying or drying in an oven or by the heat employed in the molding operation.

The fibers are finely divided by any suitable means and are preferably 0.1 mm. to 2 cm. in length and 0.1 to 3.0 mils in diameter.

The moldable or sprayable material is useful for battery cases, for insulating purposes, as waterproofing material for roofs, and the like, for covering spaced-in surfaces and irrigation canals, ponds, open dams, and the like, and for related uses. The impregnated cloth or matting can be used for either temporary or permanent roofing, for mulching, for tenting material and for related uses.

The amount of asphalt used is in the range of 10 to 85 weight percent, preferably 25 to 75 weight percent, based on blend weight, with the lower amounts normally being employed for cloth impregnation and the higher amounts for finely divided fiber or mat impregnation. The finished material can be made harder or softer by varying the penetration or softening point of the asphalt employed.

The emulsifying agents employed to prepare the asphalt emulsion may be cationic, anionic or nonionic or combinations thereof.

A particularly useful class of cationical emulsifying agents are salts of organic bases characterized by the presence of at least one basic nitrogen atom in the cation portion and where the latter contains a long chain aliphatic hydrocarbon radical of at least 12 and as many as 24 carbon atoms, preferably a straight chain fatty aliphatic group. A particularly useful subclass of such cationic emulsifying agents are the tetra-substituted quaternary ammonium compounds such as those of the formula:

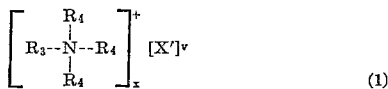

where $R_3$ is a long alkyl chain of at least 12 and as many as 24 carbon atoms, and the $R_4$'s are shorter alkyl radicals or benzyl radicals, the presence of which is sufficient to impart oil solubility and emulsifying properties to the salt material, $X'$ is a hydroxyl or an anion such as nitrate, sulfate, secondary phosphate, acetate, benzoate, salicylate and preferaby a halogen, such as chlorine or bromine, $v$ is the valence of said hydroxyl or anion, and $x$ is an integer equal to said valence. Another particularly useful subclass of cationic emulsifying agents is the salts of heterocyclic nitrogen bases, such as alkyl pyridine, alkyl quinoline, alkylisoquinoline and alkyl imidazoline, a particularly useful group of the latter being represented by the general formula:

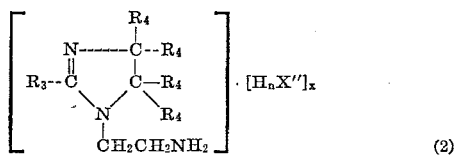

where $R_3$ is an aliphatic radical selected from the group consisting of alkyl and alkenyl radicals, preferably having 12 to 24 carbon atoms, $R_4$ is selected from the group consisting of hydrogen and alkyl radicals, preferably having 1 to 4 carbon atoms, and $X''$ is an anion such as nitrate, sulfate, secondary phosphate, acetate, benzoate, salicylate and preferably a halogen, such as chlorine and bromine, $n$ is an integer equal to the valence of the anion and $x$ is an integer of 1 to 3. Primary, secondary and tertiary monoamines and diamines are also useful, particularly the fatty acid diamines of the general formula $$R_3NH(CH_2)_mNH_2$$

where $R_3$ is as defined above in Formula 2 and $m$ is an integer in the range of 1 to 3.

Representative cationic emulsifying agents which can be used in this invention include cetyltrimethylammonium bromide, cetyldimethylammonium bromide, "tallow" trimethylammonium chloride (the term "tallow" referring to the radical of a mixture of fatty acids derived from tallow), n-dodecyltrimethylammonium chloride,
n-dodecyltrimethylammonium bromide,
n-dodecyltriethylammonium hydroxide,
n-tetradecyltrimethylammonium chloride,
n-hexadecyltripropylammonium iodide,
n-octadecyltri-n-butylammonium nitrate,
n-octadecyltriethylammonium chloride,
n-hexadecyltrimethylammonium chloride,
n-eicosyltrimethylammonium chloride,
n-tetracosyltrimethylammonium acetate,
n-pentadecylethyldimethylammonium chloride,
n-docosylpropyldimethylammonium chloride,
n-tricosyl-n-decyldiethylammonium benzoate,
n-tetradecyl-n-heptyldimethylammonium chloride,
n-octadecyl-n-decyldimethylammonium chloride,
n-heptadecyldipropylmethylammonium chloride,
n-nonadecyl-di-n-octylmethylammonium chloride,
n-hexadecylethyldimethylammonium chloride,
n-dodecylbenzyldimethylammonium chloride,
n-pentadecylbenzyldiethylammonium fluoride,
n-octadecylpropyldimethylammonium salicylate,
n-dodecyl-n-butylbenzylmethylammonium bromide,
n-nonadecyldiethylmethylammonium sulphate,
n-eicosyltrimethylammonium orthophosphate,
1-(2-aminoethyl)-2(4-tetradecenyl)-4,5-di-n-butyl-2-imidazoline,
1-(2-aminoethyl)-2(1,1-diethyl-5,7-dodecadienyl)-4,5-dimethyl-2-imidazoline,
1-(2-aminoethyl)-2-n-octadecyl-4-ethyl-2-imidazoline,
1-(2-aminoethyl)-2-n-eicosyl-2-imidazoline,
1-(2-aminoethyl-2-(1,1-dimethyldecyl)-2-imidazoline,
1-(2-aminoethyl)-2-(12-heptadecenyl)-2-imidazoline,
1-(2-aminoethyl)-2-(5,7-heptadecadineyl)-2-imidazoline,
and the like, including mixtures thereof.

There are a number of commercially available cationic emulsifying agents which can be used, including: Nalcamine G-39M, which is a mixture of 1(2-aminoethyl)-2 - n-aliphatic-2-imidazolines where the aliphatic groups are heptadecenyl and heptadecadienyl; Hyamine 1622, octylphenoxyethoxyethyldimethylbenzylammonium chloride; Hyamine 2389, methyldodecylbenzyltrimethylammonium chloride; Hyamine 10–X, octylcresoxyethoxyethyldimethylbenzylammonium chloride; Nalquate G–8–12, (1-(2-oxyethyl)-2-n-alkyl-1 (or 3) - benzyl-2-imidazolinium chlorides; Diam 11–C (n-alkyl - 1,3-propylene amines); Aliquat 26 nonotallowtrimethylammonium chloride; Alamine 26, primary tallow amine; Duomeen T, N-alkyltrimethylenediamine; and the like. In addition, an acid, such as hydrochloric acid, sulfuric acid, acetic acid or sulfamic acid, can be incorporated into the asphalt emulsion to enhance the surface active properties of the cationic emulsifying agent and impart an acid pH below 7 to the emulsion. Generally, pH's in the range of 2 to about 6.5, preferably 3 to 5, are suitable for these acidic emulsions. The amount of the acid will generally be 0.1 to 1, preferably 0.2 to 1, weight percent of the emulsion, but can be considered and calculated as part of the cationic emulsifying agent. Sulfamic acid is especially useful where the asphalt used is of an aromatic nature and has an oil fraction which has an A.P.I. gravity not exceeding 15.5, and preferably not exceeding 15, and is useful where the asphalt emulsion must pass the modified miscibility test or the cement mixing test, which are described hereinafter.

Suitable nonionic emulsifying agents include those of the general formula:

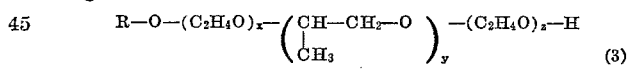

where R is selected from the group consisting of hydrogen, aryl, and alkylaryl radicals; and $x$, $y$ and $z$ are integers, such that (1) when $x$ is zero, $y$ is also zero, $z$ is in the range of 6 to 11, inclusive, and said R is one of said aryl and alkylaryl radicals, and (2) when $x$ and $y$ are each greater than zero, the sum of $x$ and $z$ is in the range of 20 to 40, inclusive, and $y$ is in the range of 40 to 60, inclusive.

Representative examples of the nonionic emulsifying agents include:

phenoxypenta(ethyleneoxy)ethanol,
phenoxyocta(ethyleneoxy)ethanol,
phenoxyennea(ethyleneoxy)ethanol,
phenoxydeca(ethyleneoxy)ethanol,
4-methylphenoxypenta(ethyleneoxy)ethanol,
2,3,6-triethylphenoxyhepta(ethyleneoxy)ethanol,
4(1,1,3,3-tetramethylbutyl)phenoxyhepta(ethyleneoxy)ethanol,
4(1,3,5-trimethylhexyl)phenoxyhexa(ethyleneoxy)ethanol,
4-nonylphenoxyhepta(ethyleneoxy)ethanol,
2,3,4,5,6-penta-n-pentylphenoxyennea(ethyleneoxy)ethanol,
2(1,3,5-trimethylhexyl)-4(1,3-dimethylbutyl)phenoxypenta(ethyleneoxy)ethanol,
4(3,5,5-trimethylheptyl)phenoxyhexa(ethyleneoxy)ethanol,
3(3,5,7,7-trimethyl-5-ethylnonyl)phenoxyhepta(ethyleneoxy)ethanol, 4(1,1,3,3,5,5,7,7-octamethyldecyl)phenoxyennea(ethyleneoxy)ethanol,
4-n-pentacosylphenoxypenta(ethyleneoxy)ethanol,
3,5-di-n-decyl-4-n-pentylphenoxydeca(ethyleneoxy)ethanol,
beta-hydroxyethyleneoxytetraconta(propyleneoxy)octadeca(ethyleneoxy)ethanol,
beta-hydroxyethoxyoctadeca(ethyleneoxy)tetracontra propyleneoxy ethanol,
beta-hydroxyethoxyennea(ethyleneoxy)pentaconta (propyleneoxy)deca(ethyleneoxy)ethanol,
betahydroxyethoxynonadeca(ethyleneoxy)hexaconta propyleneoxy)nonadeca(ethyleneoxy)ethanol,
beta-hydroxyethoxytetradeca(ethyleneoxy)pentatetraconta(propyleneoxy)tetradeca(ethyleneoxy)ethanol,
phenoxyethyleneoxypentapentaconta(propyleneoxy)octatriaconta(ethyleneoxy)ethanol,
4-methylphenoxydeca(ethyleneoxy)nonatetraconta (propyleneoxy)eicosa(ethyleneoxy)ethanol,
4(1,3,5-trimethylhexyl)-phenoxyhexa(ethyleneoxy) pentacontra(propyleneoxy)triconta(ethyleneoxy) ethanol,
4-n-pentacosylphenoxypentacosa(ethyleneoxy)pentaconta propyleneoxy)deca-(ethyleneoxy)ethanol,
2,4,5-trimethylphenoxydeca(ethyleneoxy)pentaconta propyleneoxy)pentacosa(ethyleneoxy)ethanol,
2(1,3,5-trimethylhexyl-4(1,1,3,3-tetramethylbutyl)-phenoxyeicosa(ethyleneoxy)hexatetraconta(propyleneoxy)penta(ethyleneoxy)ethanol,
4-n-pentacosylphenoxyeicosa(ethyleneoxy)hexaconta (propyleneoxy)nonatriaconta(ethyleneoxy)ethanol,
and the like, and mixtures thereof.

In addition, other nonionic emulsified agents may be used including (a) those of the general formula:

$$R-O-(C_2H_4O)_x-(CH-CH_2-O)_y-(C_2H_4O)_z-H \quad (4)$$
$$\qquad\qquad\qquad\qquad | \\ \qquad\qquad\qquad\qquad CH_3$$

where R is selected from the group consisting of hydrogen, aryl and alkaryl radicals; and $x$, $y$, and $z$ are integers such that (1) when $x$ is zero, $y$ is also zero, $z$ is in the range of 20 to 60, and R is one of said aryl and alkaryl radicals, and (2) $x$ and $y$ are each greater than zero, the sum of $x$ and $z$ is in the range of 50 to 350, and $y$ is in the range of 40 to 60; together with (b) a smaller proportion of a cationic emulsifying agent exemplified by the tetra-substituted quaternary ammonium compounds or the salts of heterocyclic nitrogen bases, and (c) naphtha.

The nonionic emulsifying agents, as shown by the general formula, represent a rather narrow class of compounds and they have a critical balance of hydrophobic component (the R and propyleneoxy groups) and hydrophilic component (ethyleneoxy groups) necessary to give the necessary mixing time. Within the general formula given earlier for these nonionic emulsifying agents, there are two preferred subclasses that can be represented by the following general formulas:

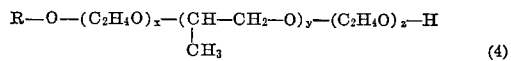

where $R_1$ is selected from the group consisting of hydrogen and alkyl radicals having 1 to 25 carbon atoms, the total number of carbon atoms in the alkyl radicals preferably does not exceed 25, and $n$ is an integer in the range of 20 to 60; and

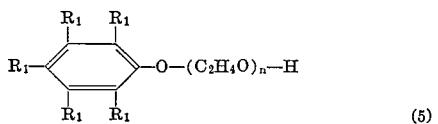

where $a$ and $c$ are integers greater than zero and whose sum is in the range of 50 to 350, $b$ is an integer in the range of 40 to 60, and $R_2$ is selected from the group consisting of hydrogen and the hydrocarbon radical:

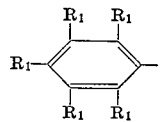

where $R_1$ is as defined above.

A particularly preferred nonionic emulsifier is Triton X–305, which is a mixture of octaphenoxypoly(ethyleneoxy)ethanol having 30 ethyleneoxy groups in the poly (ethyleneoxy) chain.

A particularly suitable combination comprises a mixture of nonionic and cationic emulsifying agents, particularly when asphalt emulsions are employed which exhibit lack of stability in the presence of siliceous aggregates.

Suitable anionic emulsifying agents employed include the sulfonates, particularly the alkyl aryl sulfonates, such as: p-dodecylbenzene sodium sulfate, n- or iso-p-octylphenoxypoly (ethyleneoxy) ethanol sodium sulfonates, sodium isopropylnaphthalene sulfonate, sodium tetrahydronaphthalene sulfonate and methylnaphthalene sodium sulfonate (Petro Ag); and the sulfates: sodium cetyl sulfate (n - hexadecylsodiumsulfate), ammonium lauryl sulfate, sodium tridecyl sulfate; and the phosphates: alkylpolyphosphates, complex amidophospho salts, as well as esters and others such as: sodium diamyl sulfosuccinate and disodium-N-octadecyl sulfosuccinamate.

Although not essential, other materials may be employed in the asphalt emulsion, including such stabilizing agents as hydroxyethylcellulose, aluminum chloride, and calcium chloride.

The invention is best described with reference to the following example wherein an asphalt emulsion was prepared by adding an aqueous solution containing 10 grams of Triton X–305 nonionic emulsifier in 165 grams of water to the charge tank of a Manton-Gaulin colloid mill. A 328.9-gram portion of 100/120 penetration asphalt was heated to about 250° F. and added slowly while recirculating the aqueous phase through the mill. After asphalt addition was completed the stator-rotor spacing was adjusted to 0.005 inch and milling was continued at about 190° F. for 3 to 4 minutes. After milling, the emulsion was stored in a capped container at room temperature for a minimum of 24 hours prior to being used.

One-mil diameter polypropylene fiber was chopped into finely-divided form with finished fiber lengths varying from about 1 mm. to 1 cm. In the preparation of the asphalt-polypropylene blend, 77.8 grams of asphalt emulsion containing 51.8 grams of asphalt was intimately mixed with 22.2 grams of polypropylene fiber and the blend was formed into a cup-shaped container. After setting overnight this container held water with no sign of leakage.

While certain examples, structures, composition and process steps have been described for purpose of illustration, the invention is not limited to these. Variation and modifications within the scope of the disclosure and the claims can readily be effected by those skilled in the art.

I claim:
1. A blend of 10 to 85 weight percent asphalt and 15 to 90 weight percent finely divided fibers of a homopolymer or copolymer of ethylene or propylene.
2. A blend of about 25 to 75 parts by weight of finely divided fibers of a homopolymer or copolymer of ethylene or propylene and sufficient asphalt emulsion to provide about 25 to 75 parts by weight of asphalt, said emulsion containing about 50 to 70 weight percent asphalt, about 25 to 50 weight percent water, and about 0.1 to 4 weight percent emulsifying agent.

3. The blend of claim 2 wherein said fibers have a length of about 0.1 millimeter to 2 centimeters and a diameter of about 0.1 to 3 mils.

4. The blend of claim 3 wherein said emulsifying agent is octaphenoxypoly(ethyleneoxy)ethanol.

5. The blend of claim 4 wherein said fibers are of polypropylene.

6. A structure of matted or woven fibers of a homopolymer or copolymer of ethylene or propylene impregnated with 10 to 85 weight percent asphalt based on the total weight of fiber and asphalt.

7. The structure of claim 6 wherein said fibers are polypropylene in the form of a mat and the amount of asphalt is about 75 to 85 weight percent of the total weight of fiber and asphalt.

8. A blend of from about 75 to about 25 parts by weight of fibers of polypropylene and sufficient asphalt emulsion to provide about 75 to 25 parts by weight, said emulsion containing about 50 to 70 weight percent asphalt, about 25 to 50 weight percent water and about 0.1 to 4 weight percent of a suitable emulsifying agent.

9. A mat consisting essentially of a mat of fibers which has been impregnated with an asphalt, the mat consisting essentially of fibers of a homopolymer or copolymer of ethylene or propylene and the asphalt being from about 10 to about 85 weight percent of the impregnated mat.

References Cited

UNITED STATES PATENTS

| | | |
|---|---|---|
| 2,688,005 | 8/1954 | Clayton. |
| 2,507,629 | 5/1950 | Gallagher _____ 106—282 |
| 3,007,825 | 11/1961 | Cubberly. |
| 2,733,159 | 1/1956 | Scoggin. |
| 2,871,212 | 1/1959 | Thayer. |
| 3,144,423 | 8/1964 | Belak _____ 260—28.5 |

FOREIGN PATENTS 611,642  11/1948  Great Britain.

MORRIS LIEBMAN, Primary Examiner

P. R. MICHL, Assistant Examiner

U.S. Cl. X.R.

106—282